(12) United States Patent
Sheridan

(10) Patent No.: US 9,513,097 B1
(45) Date of Patent: Dec. 6, 2016

(54) GAUGE HAVING A WINDOW

(71) Applicant: Brad Sheridan, Glendora, CA (US)

(72) Inventor: Brad Sheridan, Glendora, CA (US)

(*) Notice: Subject to any disclaimer, the term of this patent is extended or adjusted under 35 U.S.C. 154(b) by 144 days.

(21) Appl. No.: 14/176,247

(22) Filed: Feb. 10, 2014

(51) Int. Cl.
*G01B 5/00* (2006.01)
*F42B 35/02* (2006.01)

(52) U.S. Cl.
CPC .............. *F42B 35/02* (2013.01); *G01B 5/0023* (2013.01)

(58) Field of Classification Search
CPC ............ G01B 5/0023; G01B 3/38; F41B 5/14; F41J 5/16; F42B 35/02
USPC .......................................................... 33/506
See application file for complete search history.

(56) References Cited

U.S. PATENT DOCUMENTS

| | | | | |
|---|---|---|---|---|
| 2,358,232 A | * | 9/1944 | Johnson | ........................... 76/119 |
| 2,383,348 A | | 8/1945 | Sink | |
| 2,433,108 A | | 10/1945 | Foster | |
| 2,585,521 A | * | 2/1952 | Wandrus | ................. F42B 33/00 33/506 |
| 2,700,915 A | * | 2/1955 | Pattison | ................. F42B 33/001 86/39 |
| 3,217,417 A | | 3/1962 | Love et al. | |
| 3,209,461 A | * | 10/1965 | Wilson | ............................. 33/506 |
| 3,762,059 A | * | 10/1973 | Dawson | .......................... 33/541 |
| 4,248,132 A | * | 2/1981 | Blomseth | ................ F42B 35/02 33/506 |
| 4,336,739 A | * | 6/1982 | Alexander | ............ F42B 33/001 86/23 |
| 4,877,138 A | | 10/1989 | Motiwala | |
| 4,918,825 A | * | 4/1990 | Lesh et al. | ....................... 33/506 |
| 5,570,513 A | | 11/1996 | Peterson | |
| 6,412,385 B1 | | 7/2002 | Willis | |
| 6,718,645 B2 | | 4/2004 | Berger | |

OTHER PUBLICATIONS

Case Length Headspace Gauge. Video [Online]. YouTube.com, 2013 [retrieved on Aug. 19, 2015]. Retrieved from the Internet: <https://www.youtube.com/watch?v=dF6vbjURPul>.*
Case Gage. Datasheet [Online]. L.E. Wilson Inc., 2011 [retrieved on Aug. 19, 2015]. Retrieved from the Internet: <http://www.lewilson.com/casegage.html>.*

* cited by examiner

*Primary Examiner* — Yaritza Guadalupe-McCall
(74) *Attorney, Agent, or Firm* — The Law Office of Austin Bonderer, PC; Austin Bonderer

(57) ABSTRACT

A gauge for cartridges is disclosed. The gauge includes a gauge body defining an opening, a window, and receiving space. The opening and the receiving space share an axis and are in direct communication with each other. The window is in direct communication with the receiving space. The opening and the window are separated by a body portion of the gauge. Each gauge has a receiving space that is sized and shaped to correspond to a predetermined cartridge.

10 Claims, 12 Drawing Sheets

GAUGE HAVING A WINDOW

FIELD OF THE INVENTION

Gauges are used to determine if cartridges are within specification. Many bodies are used as cartridges, fired and reloaded. Gauges are often used to verify that the reloaded cartridges are within specification.

BACKGROUND OF THE INVENTION

Case gauges have been around in various forms for many years. The purpose of the gauge is to determine if the brass cartridge casing has been sized properly to work safely and correctly in a firearm. Each gauge is manufactured to be specific to a certain caliber of cartridge. These tools are commonly employed by reloaders, who are reusing their fired brass to make new ammunition. Brass casings will stretch or deform slightly after shooting, and in order to reuse the brass, the brass usually needs to be resized to some degree. To help the brass casing last longer, the amount of resizing should be kept to a minimum.

The headspace measurement is the critical length measurement to determine that the brass is sized correctly to fit into a firing chamber and fire. On bottleneck cases, typical in rifles, the headspace is measured from the point in the middle of the shoulder of the casing to the head (in proximity to where the primer is located). On straight wall cases, the headspace is measured from the mouth of the case to the head of the case. On a rimmed case, the headspace is measured from the rim top of the rim to the bottom of the rim or cartridge. The headspace measurement for various kinds of casings is well established.

BRIEF DESCRIPTION OF THE DRAWINGS

Many aspects of the embodiments can be better understood with references to the following drawings. The components in the drawings are not necessarily drawn to scale, the emphasis instead being placed upon clearly illustrating the principles of the embodiments. Moreover, in the drawings, like reference numerals designate corresponding parts throughout the several views.

DETAILED DESCRIPTION

The disclosure is illustrated by way of example and not by way of limitation in the figures of the accompanying drawings in which like references indicate similar elements. It should be noted that references to "an" or "one" embodiment in this disclosure are not necessarily to the same embodiment, and such references mean "at least one."

Figure 1:
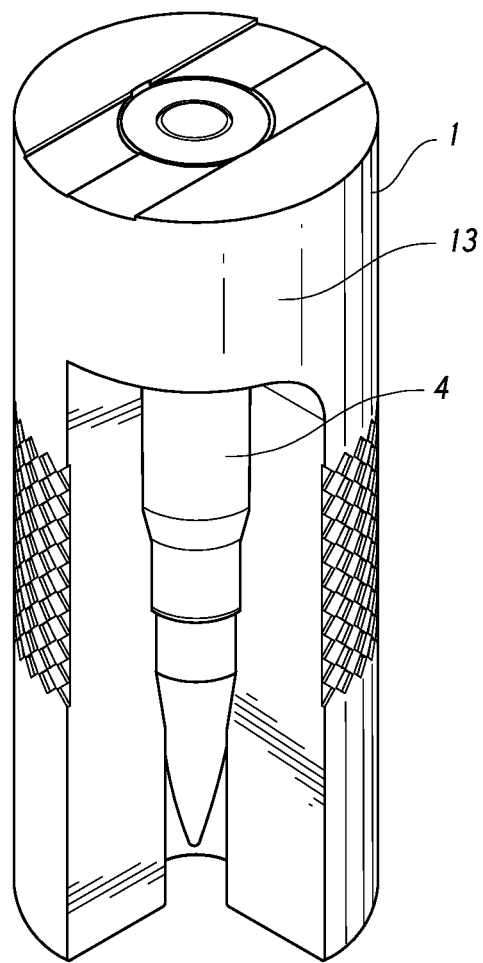
FIG. 1 shows an embodiment of a gauge with a cartridge therein.
Figure 2:
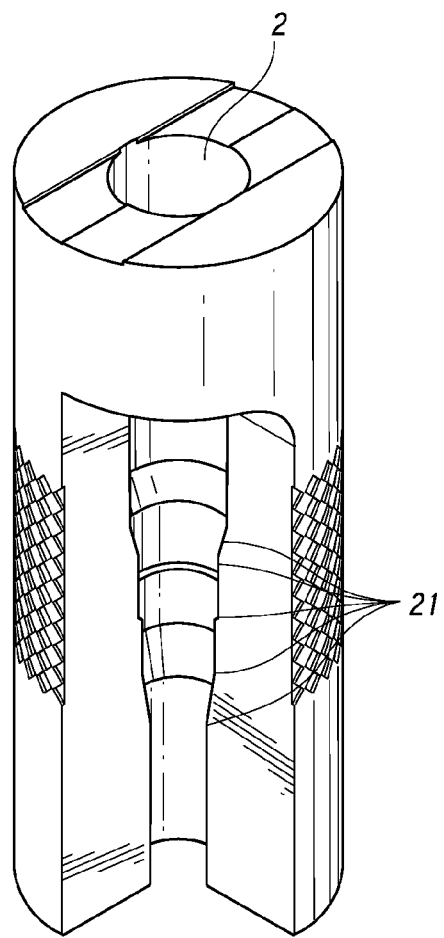
FIGS. 2-8 show different views of an embodiment of a gauge for use with cartridges that have a shoulder.
Figure 3:
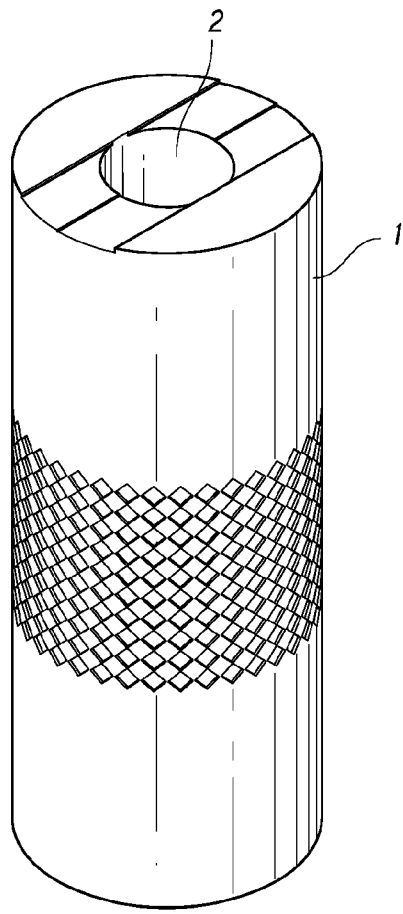

Referring to FIGS. 1 and 3, a gauge is shown. The gauge comprises a gauge body 1, and the gauge body 1 defines a receiving space 2 and a window 3. The receiving space 2 is sized to accept a cartridge 4. Depending on the caliber of the cartridge 4, different section changes 21 and diameters are used to correspond to different bodies 41, shoulders 42, necks 43, headspaces of the casing 47 and/or the bullets 45. A cartridge 4 comprises the casing 47 and a bullet 45. The casing 47, comprises the body 41, shoulder 42, and neck 43.

As can be seen in FIGS. 2 and 4-6, if required there can be more than one section change 21. In many cartridges 4 for rifles, the cartridge's effective circumference changes at three points. There is the circumference of the body 41, a shoulder 42 that extends to the neck 43. The body 41 may have a fixed diameter, or it may have a slightly decreasing circumference as it approaches the shoulder 42. The shoulder 42 typically has some length where it gradually decreases in circumference until it reaches the neck 43. Thus the receiving space 2 defines a body section 211, a gauge shoulder 212, a neck section 213, a freebore section 214, a throat section 215, and a barrel bore section 216. It is to be understood that the receiving space 2 can have two or more sections that help determine if the cartridge 4 is within specification. Different caliber cartridges 4 and the specificity to specification will determine the number and lengths of the sections. The neck 43 can also have a decreasing diameter or a constant diameter. A neck section 213 is defined between to section changes 21. The circumference of the receiving space 2 corresponding to the bullet 45 may stay consistent, the freebore section 214, and/or decrease the further down it goes, the throat section 215. The throat section 215 will decreases circumference until the barrel bore section 216. Many bullets 45 have a conical shape. In some embodiments, the freebore section 214 will correspond only to a portion of the bullet 45 with a constant or a slightly varying diameter.

Figure 4:
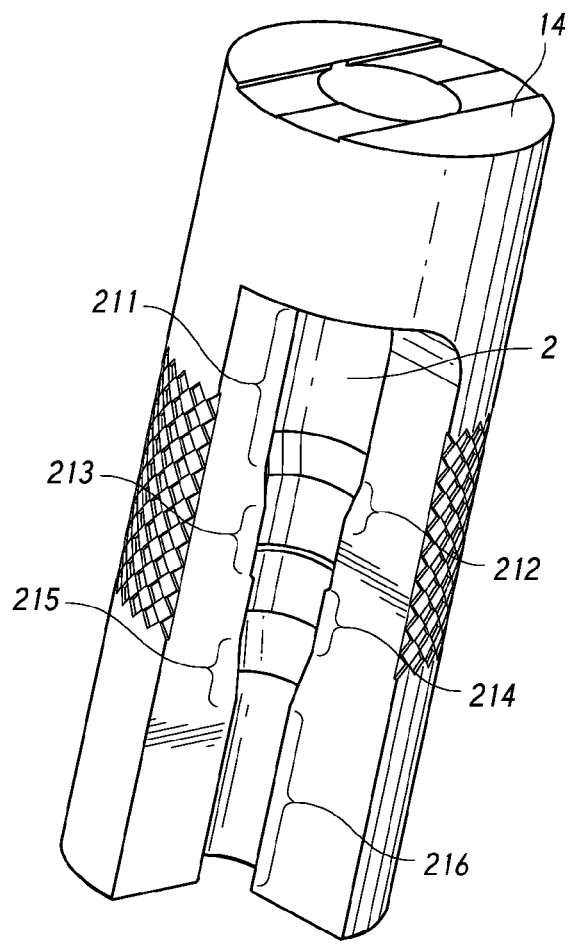
Figure 5:
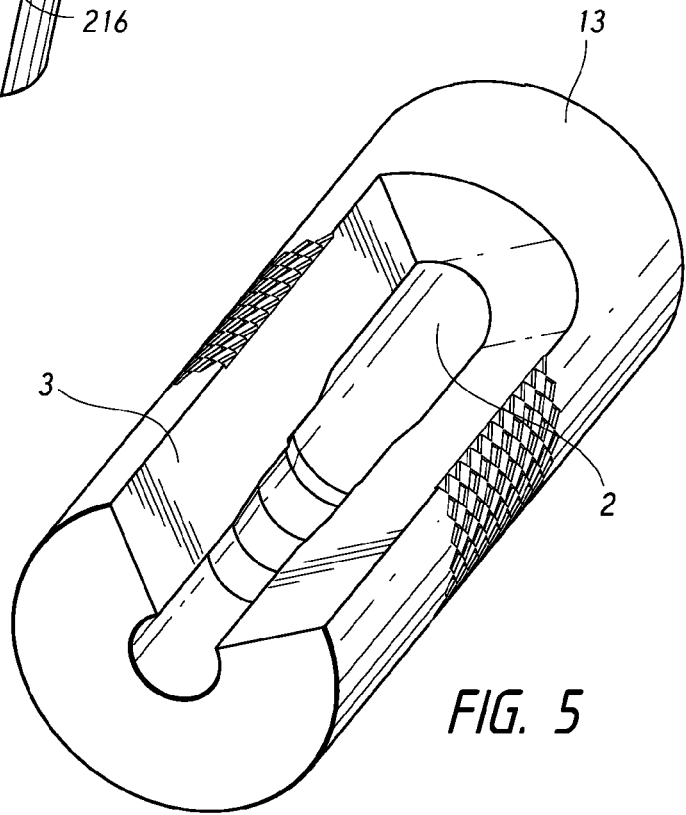
Figure 6:
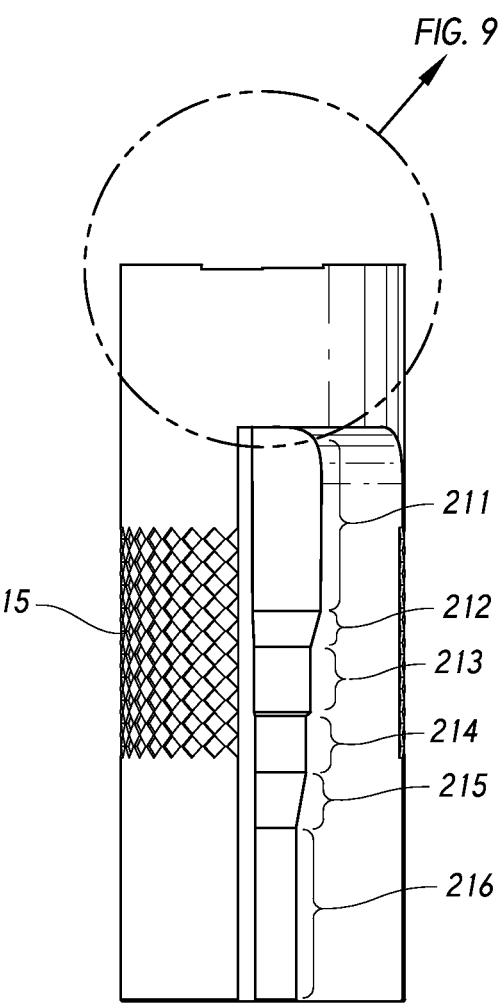

As can been seen FIGS. 4-6, the gauge body 1 defines a window 3. The body portion 13 is located between the gauge face 14 and the window 3. The window 3 extends from a position on the body section 211 to the foot 12. The window 3 can be defined by a cutout that has an angle that is less than 180 degrees as measured from the center axis of the gauge body 1. In some embodiments the cutout is about 30 degrees. In other embodiments, the cutout is about 90 degrees. The window 3 allows a user to view the interaction between the cartridge 4 and the gauge body 1. The user is able to see the interaction between the body 41, a shoulder 42, the neck 43, and the bullet 45 with the gauge body 1. This is very important to identifying the problem if the cartridge 4 or casing 47 does not fit properly. While previously a user was able to tell that there was a problem with the cartridge 4, as it did not fit properly in a gauge body 1, however there was no way to specifically identify the problem. All that was known was the cartridge 4 did not meet specification. It was unclear whether it was a problem with headspace length, or a problem with the brass diameter being larger than specification. Even if it was known that the problem was the brass diameter, it was unclear as to whether it was the body 41, shoulder 42, the neck 43, and/or the bullet 45. By having the window 3 the user is easily able to identify the reason for the cartridge 4 for being out of specification. The user is also able to visually verify that the shoulder 42 is seated properly in the gauge. Thus the user is able to better identify and fix the problem.

Figures 7, 8:
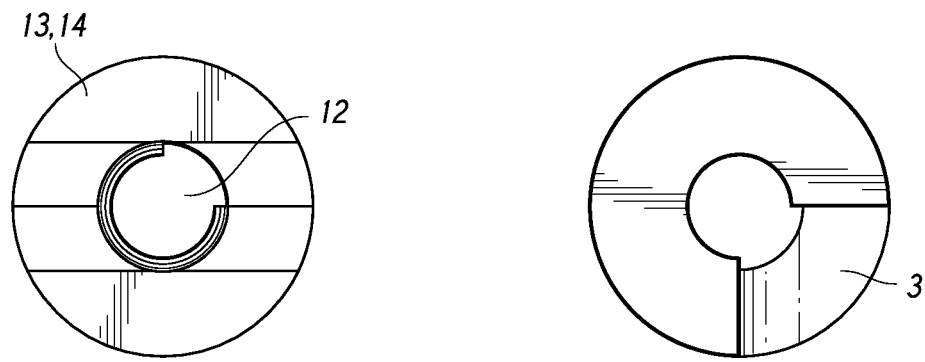

FIGS. 7 and 8 show an embodiment of the gauge body 1 from the top and the bottom respectively.

Figure 9:
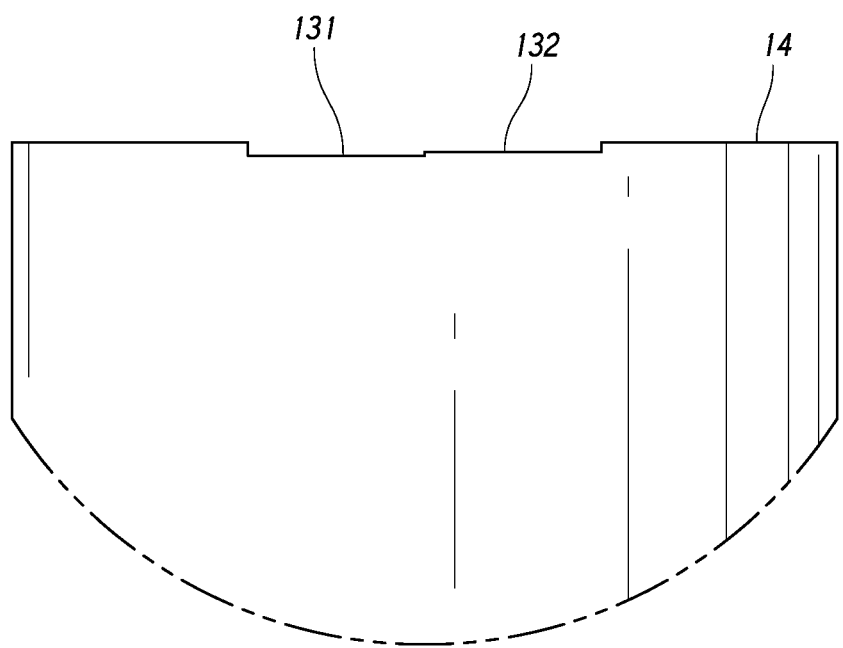
FIG. 9 shows a detail of FIG. 6 and the different steps in an embodiment.
Figure 10:
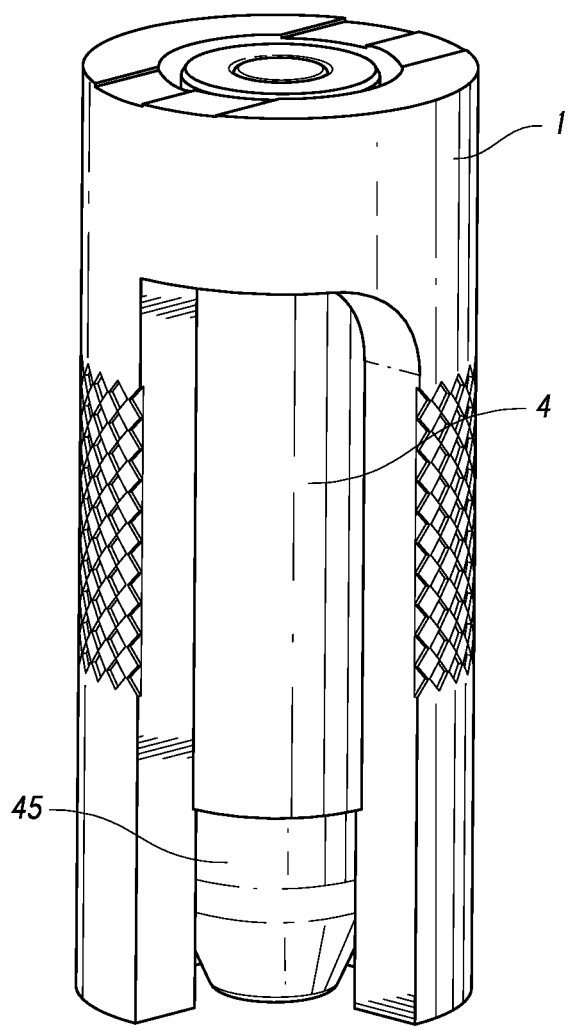
FIG. 10 shows an embodiment of a gauge with a cartridge therein
Figure 11:
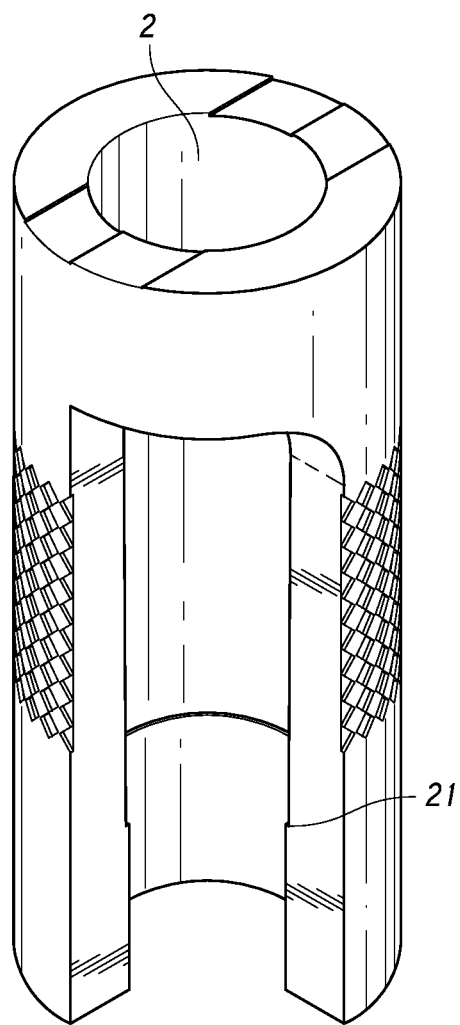
FIGS. 11-16 show different views of an embodiment of a gauge for use with cartridges that do not have a shoulder.
Figure 12:
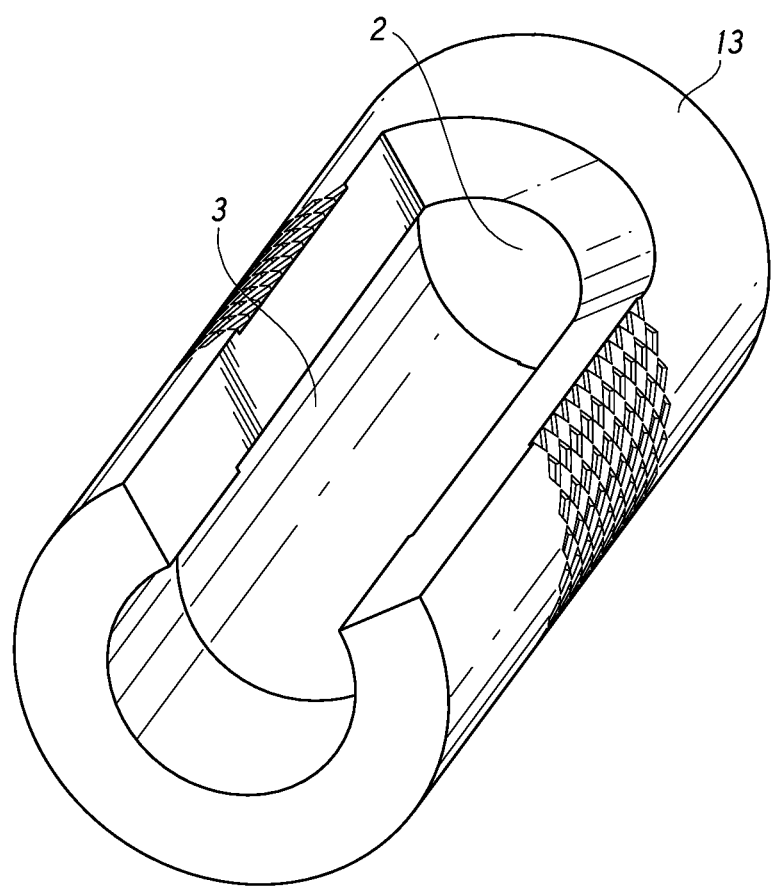
Figure 13:
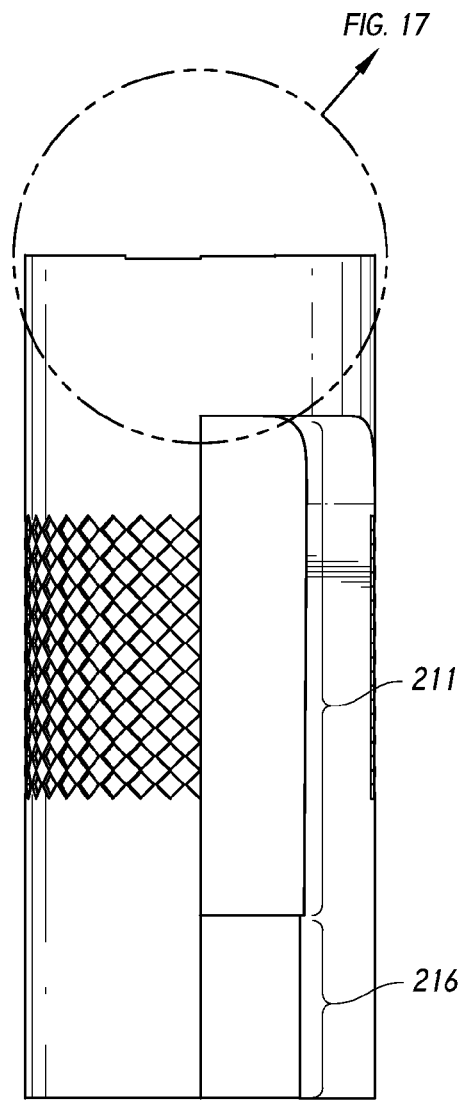
Figure 14:
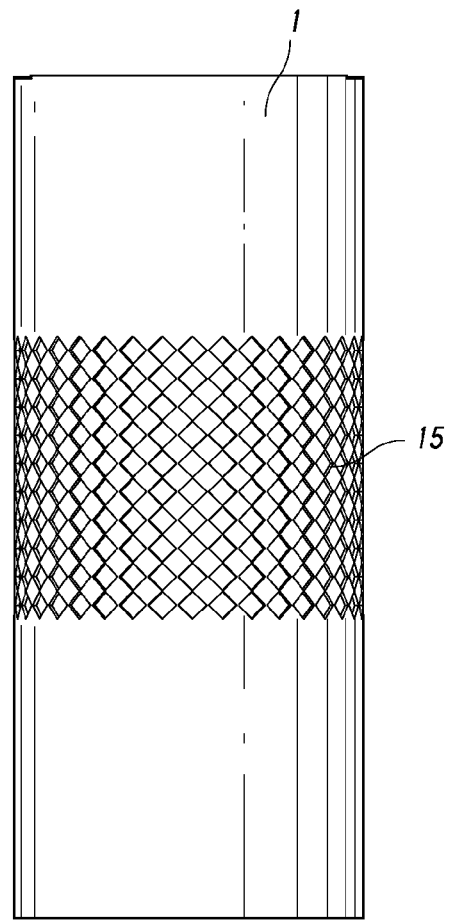
Figure 15:
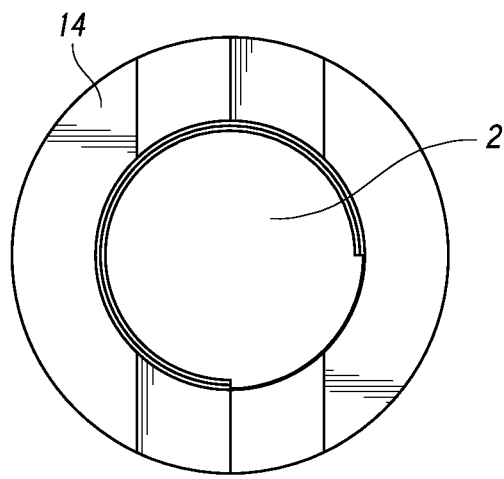
Figure 16:
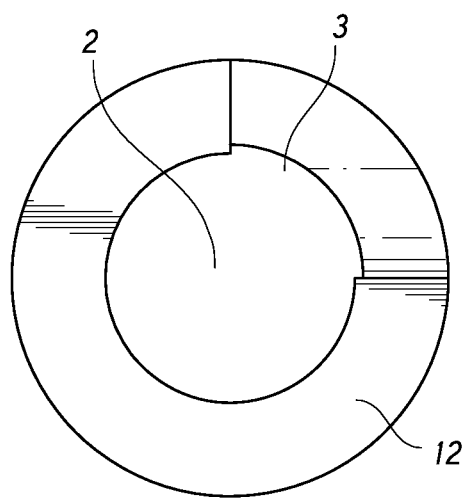
Figure 17:
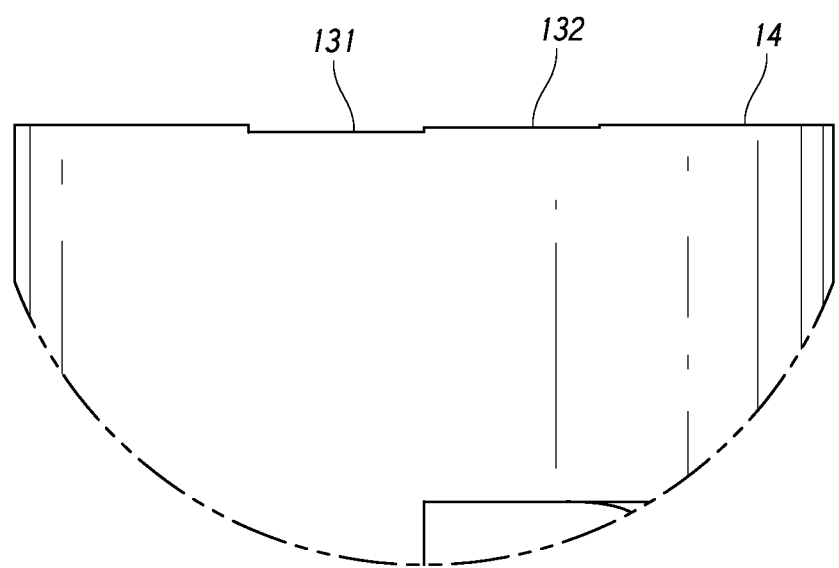
FIG. 17 shows a detail of FIG. 13 and the different steps in an embodiment.

As can be seen in FIG. 9, the gauge face 14 of the gauge body 1 has two different steps. Each of these helps verify that the headspace is within tolerances. The gauge face 14 will show the maximum allowable headspace for the firing chamber. The first step 131 will show the minimum allowable headspace for the firing chamber. The second step 132 will show the minimum allowable headspace for the cartridge 4. This can be used to help adjust the case length to fit a specific firing chamber to minimize the rework. It can also be used to ensure that it is able to fit any firing chamber, for that caliber, as long as the cartridge 4, when inserted in the receiving space 2, is between the first step 131 and the second step 132. Once the cartridge 4 is fired, the casing 47 can be inserted into the gauge body 1 and the actual headspace of the firing chamber can be inferred from the headspace length of the casing 47. This can be used as a reference point for sizing the cartridge 4 in the future for a particular firing chamber as it is understood that there are variances in firing chambers even for the same caliber firearms.

FIGS. 10-17 are very similar to FIGS. 1-9 except that the casing 47 does not decrease in diameter. As seen, only one section change 21 is present and that would correspond to where, within the specification of the cartridge 4, the bullet 45 is exposed from the casing 47. This is the location that the cartridge 4 should rest when placed in the gauge body 1. There is a body section 211 and a freebore section 214 separated by the section change 21. There are many cartridges 4, handgun and rifle calibers, that employ cartridges 4 of this design. The window 3 is defined by the gauge body 1. In some embodiments, the first step 131 and the second step 132 are present.

Figure 18:
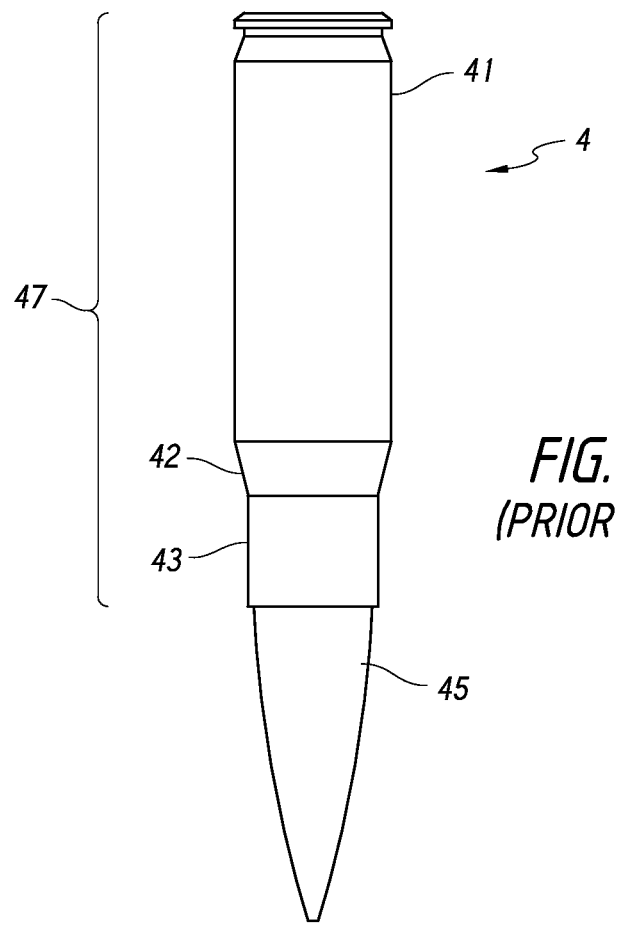
FIGS. 18 and 19 show examples of cartridges according to the prior art.
Figure 19:
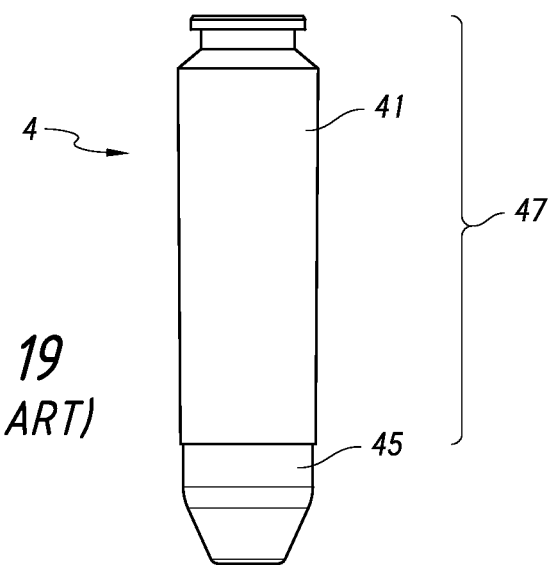

FIGS. 18 and 19, show examples of cartridges 4. FIG. 18 shows a cartridge 4 with a casing 47 comprising a shoulder 42 and a neck 43, in addition to a body 41 and a bullet 45. As seen in FIG. 19, a cartridge 4 comprising of a body 41 and a bullet 45 is provided. It is understood that there are many kinds of cartridge 4 designs and that the receiving space 2 can be sized and shaped to correspond to the specification of that cartridge 4 and/or chamber.

Some embodiments can have texturing 15, regardless of the corresponding cartridge 4. While a diamond pattern is shown, many other regular or irregular texture patterns can be used.

To use the gauge, a user inserts a cartridge 4 into the receiving space 2 though the opening 22 of the gauge body 1. In some embodiments, the cartridge 4 can only be inserted into the receiving space 2 via the opening 22 in the top the gauge body 1. When a cartridge 4 is within its specification contact will be made along substantially the entire of the length of the casing 47. The body 41, and if present the shoulder 42 and the neck 43, will be in continuous contact with the receiving space 2 of the gauge body 1. The cartridge 4 is within specification when the cartridge 4 will sit within the gauge body 1. The cartridge 4 is not within specification and will not sit properly within the gauge body 1 (e.g. an interference fit is established), the cartridge 4 extends above or below the gauge face 14 or the first step 131 respectively. It is understood that if the bullet 45 is also out of specification, the cartridge 4 will also not sit properly within the receiving space 2. If there is a problem with the cartridge 4, the window 3 allows the user to inspect the cartridge 4 in the receiving space 2. The user is able to determine the specific location where the cartridge 4 is out of specification.

Figure 20:
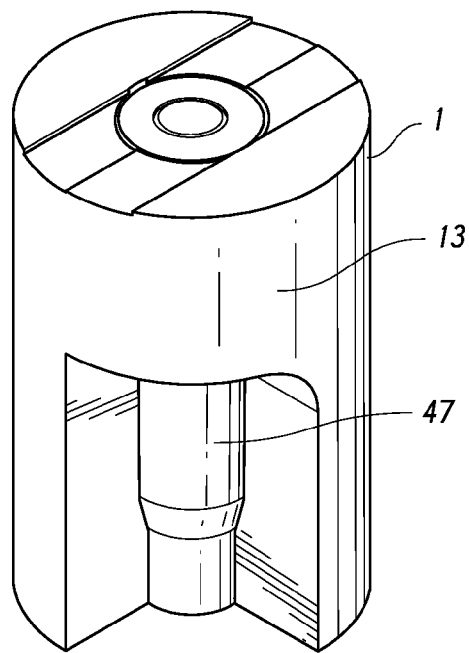
FIGS. 20-22 show an embodiment of a gauge.
Figure 21:
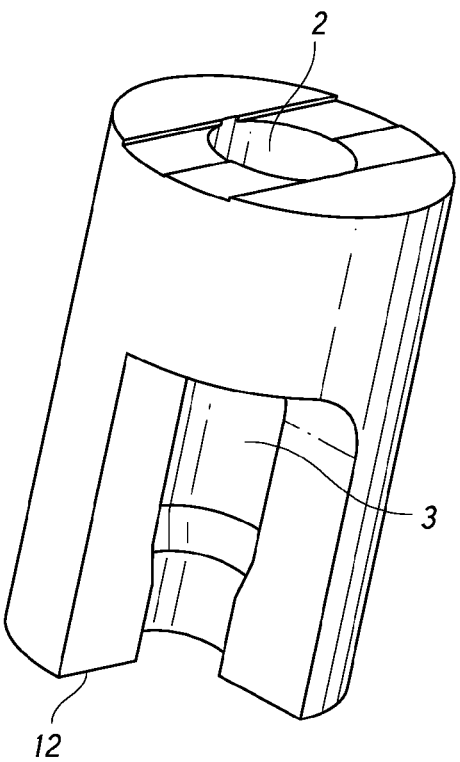
Figure 22:
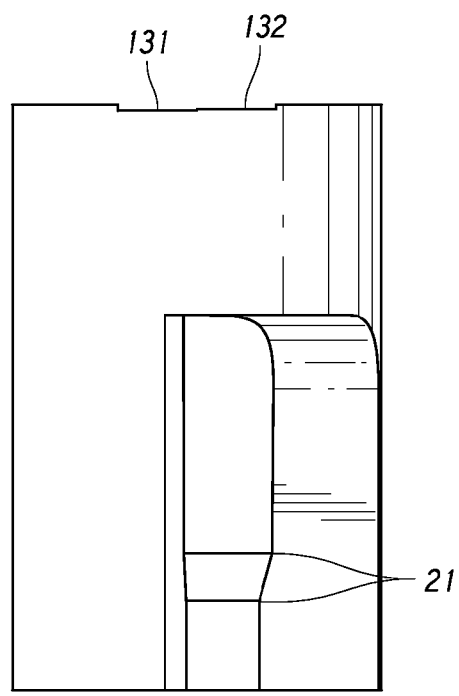

FIGS. 20-21 show an embodiment of a gauge having a gauge body 1 which extends to the end of the casing 47 of the cartridge 4. It can be used to see if the casing 47 with or without a bullet 45 is within specification. A user can insert a spent casing 47 into the receiving space 2 to determine if the firing of the cartridge 4 has expanded the casing 47 or otherwise put it out of specification. This can also be done in a longer length gauge body 1. While FIGS. 20-22 show a receiving space 2 that corresponds to a casing 47 that has a shoulder 42, it is understood that it can correspond to a casing 47 that does not have a shoulder.

A method of testing a cartridge 4 comprises the following steps:

S1, providing a gauge for a preselected caliber cartridge 4;

S2, placing a cartridge 4 of the preselected caliber into the gauge; and

S3, rotating the cartridge 4.

In S1, the gauge may comprise of gauge body 1, a receiving space 2, and a window 3. The window 3 can be defined by a cutout that defines an angle as measured from the center axis of the gauge body 1.

In S3, the rotation of the cartridge 4 can occur inside the receiving space 2 or out of the receiving space 2. Once rotated, the cartridge 4 is reseated in the receiving space 2. The angle of rotation of the cartridge 4 should be such that the sides of the cartridge 4 that were exposed by the window 3 previously are no longer exposed when reseated.

Depending on the embodiment, certain of the steps of methods described may be removed, others may be added, and the sequence of steps may be altered. It is also to be understood that the description and the claims drawn to a method may include some indication in reference to certain steps. However, the indication used is only to be viewed for identification purposes and not as a suggestion as to an order for the steps.

It is to be understood, however, that even though numerous characteristics and advantages have been set forth in the foregoing description of embodiments, together with details of the structures and functions of the embodiments, the disclosure is illustrative only and changes may be made in detail, especially in the matters of shape, size, and arrangement of parts within the principles of the disclosure to the full extent indicated by the broad general meaning of the terms in which the appended claims are expressed.

What is claimed is:

1. An apparatus comprising:
    a gauge body comprising a gauge face, a first step, a second step, and a foot; the gauge body defines a receiving space running through a center of the gauge body; and the gauge body defines a window;
    wherein the window comprises a cutout that extends from a surface of the gauge body to the receiving space; and the cutout defines an angle that is measured from a center axis of the gauge body.

2. The apparatus of claim 1, wherein the gauge face defines an opening, and the only way for a casing to be seated in the receiving space is to pass through the opening.

3. The apparatus of claim 1, wherein when a casing is seated in the receiving space and the top of the casing is located below the first step or above the gauge face, the casing is outside specification of a predetermined cartridge.

4. The apparatus of claim 1, wherein when a cartridge is seated in the receiving space, part of a body and a bullet of the cartridge is exposed to the window.

5. The apparatus of claim 1, wherein the angle is less than or equal to 180 degrees.

6. The apparatus of claim 1, wherein the angle that is less than or equal to 30 degrees.

7. The apparatus of claim 1, wherein the angle that is less than or equal to 90 degrees.

8. The apparatus of claim 1, wherein when a cartridge is seated in the receiving space, part of a body, a shoulder, a neck and a bullet of the cartridge is exposed through the window.

9. The apparatus of claim 1, wherein when a casing is seated in the receiving space, a portion of a body of the casing is exposed through the window.

10. The apparatus of claim 1, wherein when a cartridge is seated in the receiving space, a portion of a body and a bullet of the cartridge is exposed through the window.

* * * * *